United States Patent [19]

Kodama

[11] 4,433,948
[45] Feb. 28, 1984

[54] CUTTER FOR A CRANKSHAFT MILLING MACHINE

[75] Inventor: Kazuo Kodama, Komatsu, Japan

[73] Assignee: Kabushiki Kaisha Komatsu Seisakusho, Tokyo, Japan

[21] Appl. No.: 320,690

[22] Filed: Nov. 12, 1981

[51] Int. Cl.³ .................................................. B26D 1/00
[52] U.S. Cl. .................................. 407/42; 407/58; 407/60; 407/62; 407/113
[58] Field of Search .................. 407/60, 58, 61, 62, 407/64, 42, 113

[56] References Cited

U.S. PATENT DOCUMENTS 1,747,713  2/1930  Havlista ........................ 407/42
3,200,474  8/1965  Kralowetz ...................... 407/60
3,481,015  12/1969  Bogner ......................... 407/42

FOREIGN PATENT DOCUMENTS 45-6904  10/1970  Japan ........................... 407/42

Primary Examiner—Leonidas Vlachos
Attorney, Agent, or Firm—Armstrong, Nikaido, Marmelstein & Kubovcik

[57] ABSTRACT

A milling cutter for a crankshaft milling machine includes a disk, a plurality of generally square-shaped tips mounted on the disk and a plurality of forming tips mounted on the disk. The square-shaped tips and the forming tips are alternately arranged in two rows for effecting simultaneous machining of both end portions of each crank or main bearing.

Each square-shaped tip is arranged to machine main and crank bearings and rounded corners of the bearings while each forming tip is mounted to machine side walls of webs between the bearings, shoulders each provided between the respective bearings and webs, the rounded corners and the main and the crank bearings.

4 Claims, 7 Drawing Figures

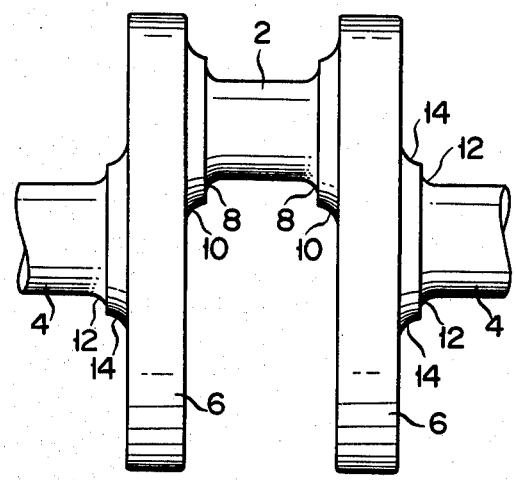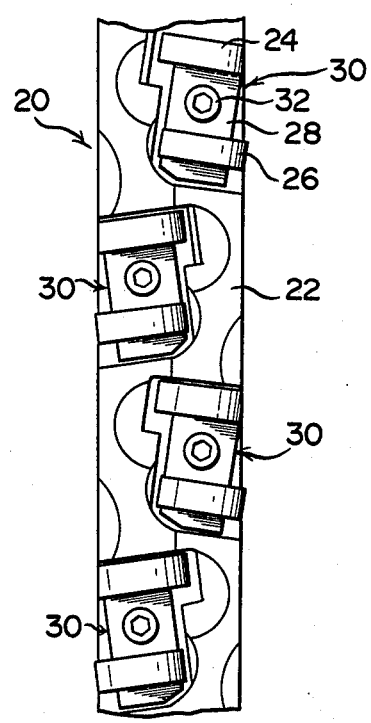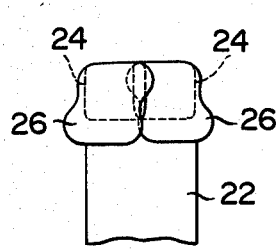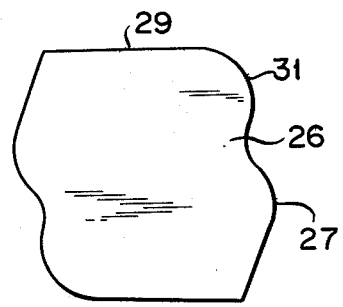

CUTTER FOR A CRANKSHAFT MILLING MACHINE

BACKGROUND OF THE INVENTION

This invention relates to a milling cutter for a crankshaft milling machine.

One of conventional milling cutters of the kind specified comprises a disk and a plurality of generally lozenge-shaped tips mounted on the periphery of the disk. The tips are grouped into two, one of which is radially inwardly located and the other radially outwardly located and each group has two rows mounted along both peripheral edges of the disk.

The radially inwardly mounted group of tips are adapted to machine side walls of webs provided between main and crank bearings while the radially outwardly located group of tips are adapted to machine main and crank bearings and shoulders provided between the bearings and webs. It is difficult, however, to produce a fine pitch milling cutter by the above arrangement because of difficulty in providing enough tip pockets for mounting tips.

Another type of conventional milling cutter comprises a disk and a plurality of forming tips mounted on the disk in two rows. The "forming tip" as used in this specification means a tip which produces generally its inverse form on the workpiece. This type of milling cutter, however, is not practical because each forming tip can be used only four different cutting edge positions by rotating it and turning it over.

SUMMARY OF THE INVENTION

It is therefore an object of the present invention to provide a milling a cutter for a crankshaft milling machine which overcomes the above noted problems of the prior art.

Another object of the present invention is to provide a milling cutter for a crankshaft milling machine which can provide a fine pitch cutting of a crankshaft economically and efficiently.

A further object of the present invention is to provide a milling cutter for a crankshaft milling machine which can effectively use cutting edges of tips by mounting two different types of tips on a disk.

In accordance with an aspect of the present invention, there is provided a milling cutter for a crankshaft milling machine for milling a crankshaft having a plurality of main bearings, crank bearings and webs connecting each crank bearing to adjacent main bearings, each end of the bearings having a rounded corner connected to a side wall of a shoulder which, in turn, is connected to a side wall of one of the webs, the milling cutter comprising: a disk having a peripheral mounting surface; a plurality of generally square-shaped tips mounted on the mounting surface of said disk with a spaced relation from each other, each of said square-shaped tips being arranged to machine the main and the crank bearings and the rounded corners; and a plurality of forming tips mounted on the mounting surface of said disk with a spaced relation from each other, said square-shaped tips and said forming tips being alternately arranged, each of said forming tips being arranged to machine the side walls of the webs, the shoulders, the rounded corners and the main and the crank bearings.

In a preferred embodiment, the square-shaped tips and the forming tips are arranged in two rows for simultaneously effecting both sides milling of a bearing.

The above and other objects, features and advantages of the present invention will be readily apparent from the following description taken in conjunction with the accompanying drawings.

BRIEF DESCRIPTION OF THE DRAWINGS

FIG. 1 is a front elevational view of a crankshaft showing a part thereof;

FIG. 2 is a top plan view of a milling cutter partly cut-away according to the present invention;

FIG. 3 is a front elevational projected view of a cutter partly cut-away showing diagrammatically how tips are mounted on a disk;

FIG. 4 is a plan view of a forming tip having a point-symmetry configuration;

DESCRIPTION OF THE PREFERRED EMBODIMENTS

Figure 5:
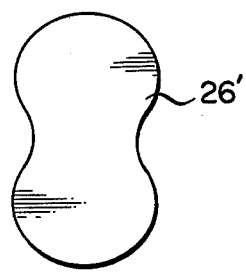
FIG. 5 is a plan view of another embodiment of forming tip having a projected cocoon-shaped configuration which is symmetrical with respect to two planes crossing each other at right angles.

The present invention will now be described in detail below with reference to the accompanying drawings.

Referring first to FIG. 1 showing a part of a crankshaft, reference numeral 2 denotes crank bearings, 4 main bearings. Provided between the crank bearings 2 and the main bearings 4 and interconnecting them are webs 6. Both ends 8 of each crank bearing 2 are rounded and a shoulder 10 is provided between the web 6 and each rounded end 8 of the respective crank bearings 2. Similarly both ends 12 of each main bearing 4 are rounded and a shoulder 14 is provided between the web 6 and each rounded end 12 of the respective main bearings 4.

Preferably each rounded end 8 of the crank bearings 2 has the same radius as that of the main bearings 4 and each shoulder 8 of the crank bearings 2 has the same configuration as that of the main bearings 4 so that the same milling cutter can machine both the crank bearings 2 and the main bearings 4.

Referring next to FIGS. 2 and 3 showing external milling cutter 20 of the invention, the milling cutter 20 comprises a disk 22, a plurality of generally square-shaped tips 24 detachably mounted on a peripheral surface of the disk 22 and a plurality of forming tips 26 detachably mounted on the peripheral surface of the disk 22.

Specifically, in a preferred embodiment shown in FIG. 2, each square-shaped tip 24 and each forming tip 26 are mounted on a seat member 28, thus forming a tip set 30. These tip sets 30 are fastened to the peripheral surface of the disk 22 by bolts 32 in a zigzag manner, thus providing two rows of tip sets on the peripheral surface of the disk 22 as shown in FIG. 2. Accordingly, when the milling cutter 20 is introduced between the webs 6, 6 of the stationary crankshaft until it reaches the crank bearing diameter and then the crankshaft is rotated about its principal axis together with the rotation of the milling cutter 20, each side of the crank bearing 2 is machined by either row of tip sets 30.

Each forming tip 26 is formed in a point-symmetrical configuration as shown in FIG. 4 and an edge portion 27 thereof projecting sideways from the disk 22 is adapted to machine side wall of the web 6 and the shoulder 10 while a leading end edge portion 29 thereof is adapted to machine the crank bearing 2. Curved corner 31 of the forming tip 26 is adapted to machine the rounded end 8 of the crank bearing 2. The forming tip 26 shown in FIG. 4 can be used four different cutting edge positions by rotating it and turning it over.

FIG. 5 shows another embodiment of forming tip having a projected cocoon-shaped configuration. Since this forming tip 26' is symmetrical with respect to two planes crossing each other at right angles and each forming tip 26' is mounted on the disk 22 with being slightly slanted, the forming tip 26' shown in FIG. 5 can be used eight different cutting edge positions by rotating it and turning it over.

Figure 6:
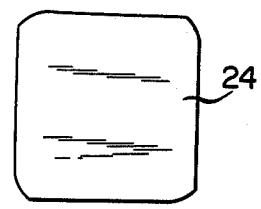
FIG. 6 is a plan view of a square-shaped tip.

Referring next to FIG. 6 showing a generally square-shaped tip 24 having four rounded corners, one end of each rounded corner is tangent to one side of the tip 24 and the other end thereof crosses the other adjacent side of the tip 24. Each square-shaped tip 24 is mounted on the peripheral mounting surface of the disk 22 in such a way that the above mentioned other end of the rounded corner which is radially and axially outwardly positioned faces sideways thereby preventing the other adjacent side of the tip 24 from interfering with the side wall of the shoulder 10 yet providing milling of the rounded end 8 of the crank bearing 2 with the rounded corner edge of the tip 24. As clearly shown in FIG. 3, each square-shaped tip 24 is axially inwardly receded with respect to each forming tip 26 in order to prevent the interference from occurring between the side of the tip 24 and the side of the shoulder 10.

As far as it is assured that no interference be occurred between the side of the tip 24 and the side of the shoulder 10, the shape of the rounded corner of the tip 24 is not limited to that shown in FIG. 6. For example, a square-shaped tip having rounded corners, each side of one of which is tangent to adjacent side of the tip and each of which has a radius smaller than that of the rounded end 8 of the crank bearing 2 can be adopted. The square-shaped tip 24 shown in FIG. 6 can be used eight different cutting edge positions by rotating it and turning it over.

Figure 7:
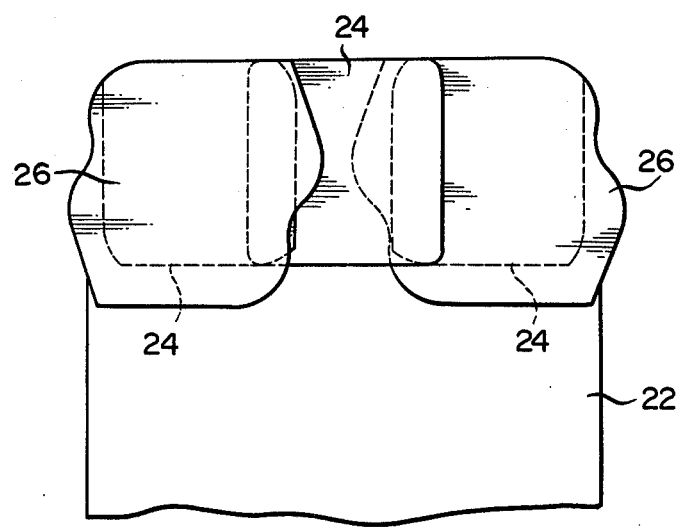
FIG. 7 is similar to FIG. 3 but showing another embodiment of a cutter especially adapted for milling a wider bearing.

FIG. 7 shows a modified cutter especially adapted for cutting or machining a wider main bearing or crank bearing. In addition to two rows of square-shaped tips 24 and forming tips 26 mounted on the peripheral surface of the disk 22, a row of square-shaped tips 24 are mounted between the above two rows.

Since the present invention is constructed as mentioned hereinabove, one half of the total number of tips comprise, in the case of two rows mountings, generally square-shaped tips 24 each of which can be used eight different cutting edge positions.

Furthermore, it is possible to provide the same number of effective tips with only a half number of total tips of the conventional arrangement. The term "effective tip" as used herein means a tip for cutting the cylindrical portion of a main or crank bearing. Accordingly, a fine pitch milling cutter can be economically provided.

It is to be understood that the above description is by way of example only, and it is not intended to be limited to the details shown and described, since various modifications and structural changes may be made without departing from the spirit of the present invention.

What is claimed is:

1. A milling cutter for a crankshaft machine for milling a crankshaft having a plurality of main bearings, crank bearings and webs connecting each crank bearing to adjacent main bearings, each end of the bearings having a rounded corner connected to a side wall of a shoulder which, in turn, is connected to a side wall of one of the webs, the milling cutter comprising:
   a disk having two end faces and a peripheral mounting face; and
   a plurality of tip sets detachably mounted on the mounting face of said disk in a zigzag fashion forming two rows of said tip sets, each row being offset towards either one of end faces of said disk, each of said tip sets comprising:
   a generally square-faced tip arranged to machine the main and crank bearings and the rounded corners of the bearings, said square-shaped tip having four rounded corners, one end of each rounded corner being tangent to one side of the tip and the other end thereof crossing another side of the tip and wherein said square-shaped tip is mounted on the mounting face of said disk in such a way that the other end of the rounded corner which is radially and axially outwardly positioned faces sideways thereby preventing the other side of the tip from interfering with the side wall of the shoulder;
   a forming tip arranged to machine the side walls of the webs, the shoulders, the rounded corners and the main and crank bearings; and means to fasten said tip sets to the mounting face of said disk.

2. A milling cutter for a crankshaft milling machine as recited in claim 1 wherein each of said forming tips is formed in point-symmetry.

3. A milling cutter for a crankshaft milling machine as recited in claim 1 wherein each of said forming tips is flat-shaped and has projected cocoon-shaped contour.

4. A milling cutter for a crankshaft milling machine as recited in claim 3 wherein each of said forming tips is symmetrical with respect to two planes crossing at right angles with each other.

* * * * *